(12) United States Patent
Roos (10) Patent No.: US 9,566,967 B2
(45) Date of Patent: Feb. 14, 2017

(54) ELECTRIC PARKING BRAKE HAVING A GEARING UNIT

(71) Applicant: BROSE FAHRZEUGTEILE GMBH & CO. KOMMANDITGESELLSCHAFT, WUERZBURG, Wuerzburg (DE)

(72) Inventor: Stephan Roos, Wertheim-Hoehefeld (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 16 days.

(21) Appl. No.: 14/658,425

(22) Filed: Mar. 16, 2015

(65) Prior Publication Data

US 2015/0183413 A1    Jul. 2, 2015

Related U.S. Application Data

(63) Continuation of application No. PCT/EP2013/002758, filed on Sep. 13, 2013.

(30) Foreign Application Priority Data

Sep. 14, 2012  (DE) .................. 10 2012 018 142

(51) Int. Cl.
*F16D 65/28*    (2006.01)
*B60T 13/74*    (2006.01)
(Continued)

(52) U.S. Cl.
CPC .............. *B60T 13/743* (2013.01); *B60T 7/107* (2013.01); *B60T 11/046* (2013.01); *B60T 13/746* (2013.01);
(Continued)

(58) Field of Classification Search
CPC  F16D 2121/24; F16D 2125/48; F16H 57/033; F16H 2057/0222; B60T 13/743; B60T 13/746
See application file for complete search history.

(56) References Cited

U.S. PATENT DOCUMENTS

| 363,776 A | 5/1887 | Sweet |
|---|---|---|
| 1,333,490 A | 3/1920 | Hines |

(Continued)

FOREIGN PATENT DOCUMENTS

| DE | 343283 C | 10/1921 |
|---|---|---|
| DE | 1775705 B1 | 12/1971 |

(Continued)

*Primary Examiner* — Nicholas J Lane
(74) *Attorney, Agent, or Firm* — Laurence A. Greenberg; Werner H. Stemer; Ralph E. Locher (57) ABSTRACT

A gearing unit of a motor vehicle actuator, in particular an electric parking brake, includes a gearing housing in which a driven first shaft and a driving second shaft having fixed rotational axes are located. A first toothed wheel is mounted on the first shaft and a second toothed wheel is mounted on the second shaft. The first toothed wheel and the second toothed wheel engage with one another through a third toothed wheel. The housing for the third toothed wheel has at least two spatially offset bearing points in order to adjust a transmission ratio between the first shaft and the second shaft. An electric parking brake having a gearing unit is also provided.

7 Claims, 3 Drawing Sheets

(51) Int. Cl.
    *B60T 7/10*     (2006.01)
    *B60T 11/04*     (2006.01)
    *F16H 57/022*     (2012.01)
    *F16H 57/033*     (2012.01)
    *F16D 121/24*     (2012.01)
    *F16D 125/48*     (2012.01)
    *F16H 57/02*     (2012.01)

(52) U.S. Cl.
    CPC ......... *F16H 57/022* (2013.01); *F16D 2121/24* (2013.01); *F16D 2125/48* (2013.01); *F16H 57/033* (2013.01); *F16H 2057/0222* (2013.01); *F16H 2057/02034* (2013.01); *F16H 2057/02082* (2013.01); *Y10T 74/1957* (2015.01)

(56) References Cited

U.S. PATENT DOCUMENTS

| | | | |
|---|---|---|---|
| 1,919,512 A | 7/1933 | Helgeby et al. | |
| 3,236,114 A * | 2/1966 | Freber | A63H 31/00 74/325 |
| 3,306,107 A | 2/1967 | Freber | |
| 3,465,608 A | 9/1969 | Bachi | |
| 4,802,372 A * | 2/1989 | Harrod | F16H 1/20 74/325 |
| 5,095,767 A * | 3/1992 | Spridco | F16H 1/20 248/188.2 |
| 5,953,964 A | 9/1999 | Cognigni et al. | |
| 7,648,006 B2 | 1/2010 | Deutloff et al. | |
| 8,061,490 B2 | 11/2011 | Di Stefano et al. | |
| 8,662,263 B2 | 3/2014 | Deutloff et al. | |
| 2002/0083786 A1 | 7/2002 | Yan et al. | |
| 2003/0205104 A1* | 11/2003 | Varela | F16H 57/033 74/606 R |
| 2007/0240950 A1* | 10/2007 | Deutloff | B60T 7/107 188/265 |
| 2015/0152929 A1* | 6/2015 | Roos | B60T 7/107 188/162 |
| 2015/0184713 A1* | 7/2015 | Roos | B60T 7/085 188/158 |

FOREIGN PATENT DOCUMENTS

| | | |
|---|---|---|
| DE | 10361127 A1 | 7/2005 |
| DE | 102006034594 A1 | 2/2008 |
| EP | 1619398 A1 | 1/2006 |
| WO | 2005061293 A1 | 7/2005 |
| WO | 2007093613 A1 | 8/2007 |

\* cited by examiner

ELECTRIC PARKING BRAKE HAVING A GEARING UNIT

CROSS-REFERENCE TO RELATED APPLICATION

This is a continuation, under 35 U.S.C. §120, of copending International Application No. PCT/EP2013/002758, filed Sep. 13, 2013, which designated the United States; this application also claims the priority, under 35 U.S.C. §119, of German Patent Application DE 10 2012 018 142.6, filed Sep. 14, 2012; the prior applications are herewith incorporated by reference in their entirety.

BACKGROUND OF THE INVENTION

Field of the Invention:

The invention relates to a gearing unit of a motor vehicle actuator, in particular of an electric parking brake. The invention also relates to an electric parking brake having a gearing unit.

An electric parking brake replaces a handbrake lever of a motor vehicle. The parking brake makes it possible for a defined force to be applied, for example to a brake cable pull or a brake cable. In that case, it can be ensured that a defined minimum force is applied, wherein a likewise defined maximum force is not exceeded. That is necessary firstly in order to obtain a reliable braking action and secondly in order to prevent destruction of force-transmitting components.

Conventionally, the parking brake includes an electric motor which, in order to impart the force, acts on further components of the parking brake through a gearing. In that case, the electric motor is suitably constructed in such a way that the defined minimum force is attained at a motor utilization level of approximately 40%. Such a selection of the electric motor has the effect firstly that adequate force reserves are available and secondly that adequately rapid application of the force is ensured. A disadvantage thereof is that, for every intended application, it is necessary to provide a particular electric motor type with a level of motor power adapted to the respective application.

SUMMARY OF THE INVENTION

It is accordingly an object of the invention to provide an especially suitable gearing unit which, in particular, can be used in a multiplicity of actuators with different force output levels and which overcomes the hereinafore-mentioned disadvantages of the heretofore-known units of this general type. It is a further object of the invention to provide a particularly suitable electronic parking brake which can be advantageously used in a multiplicity of different motor vehicle types.

With the foregoing and other objects in view there is provided, in accordance with the invention, a gearing unit of a motor vehicle actuator, in particular of an electric parking brake, the gearing unit comprising a gearing housing, a driven first shaft and a driving second shaft disposed in the gearing housing, the shafts each having a stationary axis of rotation, a first gearwheel attached to the first shaft and a second gearwheel attached to the second shaft, a third gearwheel through which the first gearwheel and the second gearwheel engage one another, and the gearing housing having a displaceable bearing point or at least two spatially offset bearing points, between the first shaft and the second shaft, for the third gearwheel.

The gearing unit is a constituent part of an actuator of a motor vehicle, for example of a seat adjuster, of an electric window lifting mechanism or of an automatic transmission. The motor vehicle actuator is, however, particularly preferably a constituent part of a parking brake through the use of which the motor vehicle is secured so as to be prevented from moving along the ground. During operation, the motor vehicle actuator imparts, in particular, a force which is higher than a particular minimum force and below a maximum force.

The gearing unit includes a housing which, in particular, is or can be closed. For this purpose, the gearing housing has a housing body and a housing cover which, in the assembled state, are fixed to one another. The two parts are, for example, adhesively bonded, screwed or welded to one another. The housing is advantageously composed of a plastic.

Within the housing there are disposed a first and a second shaft, each of which carries a gearwheel, the gearwheels being disposed, for example, perpendicular to the respective shaft. The gearwheel assigned to the first shaft is referred to as a first gearwheel, and the gearwheel assigned to the second shaft is referred to as a second gearwheel. A gearwheel is to be understood, in particular, to mean a circular disk which, during a rotational movement, drives and thus sets in rotation a further gearwheel which is in engagement therewith. For this purpose, the gearwheel has, in a suitable manner, a number of circumferentially disposed teeth. It is likewise possible for that surface of the gearwheel through the use of which the gearwheel is connected to the further gearwheel to merely be roughened, in such a way that the coefficient of friction is increased.

The first and the second shaft each have an axis of rotation which is stationary. In other words, the spacing between the two axes of rotation is constant, and the position of each axis of rotation with respect to the housing is fixed. In this case, the shafts extend, in particular, along the respective axes of rotation, which are suitably parallel to one another.

The shafts are advantageously likewise stationary. As an alternative to this, a movement of at least one of the shafts along the axis of rotation during the operation of the gearing unit is provided for or possible. In this case, the spacing between the two axes of rotation is greater than zero (0) and is, in particular, greater than the sum of the radius of the first gearwheel and the radius of the second gearwheel. Consequently, the first gearwheel is not in direct mechanical contact with the second gearwheel.

Rather, the first and second gearwheels are in contact with one another through a third gearwheel. In other words, a transmission of force from the first shaft to the second shaft takes place through the third gearwheel. For this purpose, the first and the second gearwheel are suitably in direct mechanical contact with the third gearwheel. As an alternative to this, the transmission of force takes place through further components, for example further gearwheels. In particular, a power-transmitting connection is produced between the first and the second gearwheel by using the third gearwheel.

The third gearwheel is held by using a bearing point which includes, for example, a bearing bushing and through the use of which the third gearwheel is rotatable. The housing has a number of such bearing points, that is to say, in particular, at least two bearing points, situated at different spatial locations. As an alternative to this, the bearing point is displaceable, and is for example fixable at least at two positions. In particular, the two bearing points situated at different spatial locations are realized by using one displaceable bearing point.

The respective bearing points preferably differ in terms of the spacing to at least one of the two axes of rotation. For example, the spacing between the bearing point of the third gearwheel and one of the two axes of rotation is constant, and the bearing point consequently lies on a circular path around the axis of rotation. By contrast, at least two of the bearing points differ in terms of the spacing to the second axis of rotation.

Through the selection or positioning of the bearing point, a transmission ratio between the first shaft and the second shaft can be adjusted, wherein the first shaft is driven, for example by using an electric motor, and in particular, further components are operatively connected to the second shaft. In this case, a transmission ratio is to be understood to mean the number of rotations correspondingly performed by the second spindle in the event of a rotation of the first shaft through 360° about its axis of rotation during a transmission of force. The radius of at least one of the gearwheels is suitably adapted in such a way that a transmission of force between the two shafts remains possible. As an alternative to this, a further gearwheel is used to realize the transmission of force.

The gearing unit makes it possible for the motor vehicle actuator to be used for a multiplicity of different motor vehicles and motor vehicle types, without the need to make structural modifications to the actuator. In this case, it is even possible for the same components to be used in the different types. The adaptation of the actuator is instead realized through the selection of the bearing point of the third gearwheel, which makes it possible to realize a different transmission ratio between the driven gearwheel and the driving gearwheel by way of the diameter and number of teeth thereof.

In accordance with another feature of the invention, the bearing points advantageously lie along a straight line, which will hereinafter be referred to as a straight adjustment line. The bearing points are, for example, discrete locations along the straight adjustment line, or the bearing points may be selected in substantially continuous fashion along the straight adjustment line. Consequently, the setting of the transmission ratio during the assembly process is relatively simple, because the spacings between the bearing point and the axes of rotation can be determined in a relatively simple manner; the spacings have a direct relationship to the transmission ratio. The axes of rotation particularly preferably lie on the straight adjustment line. In this way, the determination of the spacings of the bearing point to the two axes of rotation, and of the ratio of the spacings to one another, is simplified. Also, the space requirement of the gearing unit is relatively small.

In accordance with a further feature of the invention, the bearing point of the third gearwheel expediently has a movable slide into which there is formed, in particular, an opening. The mounting of the third gearwheel is expediently realized by using an axle journal, which at one side is fastened to, for example integrally formed on, the third gearwheel and at the other side is inserted through the opening of the slide. This both simplifies the assembly process and also reduces the manufacturing costs. The cross section of the opening is suitably substantially identical to the cross section of the axle journal, and is in particular circular. In other words, in the assembled state, the axle journal lies in the opening with a form-locking connection, wherein a rotational movement of the axle journal in the opening is possible without particularly high friction. The axle journal is thus disposed in the opening with a clearance fit.

It is, for example, the case that, during the assembly process, the slide is moved to the corresponding position and fixed there, for example by a screw connection or adhesive bonding. As an alternative to this, the slide is movable even in the assembled state, and is held in position merely by using the third gearwheel which is in engagement with the first and second gearwheels. In this way, a retroactive variation of the transmission ratio of the gearing unit is also possible. If the bearing points lie on the straight adjustment line, the slide is displaceable along the straight line. In this way, substantially any point along the straight adjustment line can be selected as the position of the bearing point of the third gearwheel.

In accordance with an added feature of the invention, the first gearwheel is suitably integrally formed on the first shaft. This has the effect that the service life of the gearing unit is increased, because there is a relatively stable connection between the first shaft, which is driven, and the first gearwheel, which transmits the applied force to the further components of the gearing unit. In particular, the outer diameter of the gearwheel is less than or equal to the diameter of the first shaft. In this way, it is made possible for the first shaft to be inserted into the gearing unit through a cutout which functions as a bearing for the first shaft. Even in the case of a different type of bearing configuration, it is made possible for the cutout to be manufactured with relatively small dimensions, which reduces an ingress of particles into the housing.

It is likewise made possible for the first shaft to be connected to further components. For example, the first shaft is the motor shaft of an electric motor, and components of the electric motor are disposed on the first shaft. It is consequently made possible for the electric motor to be manufactured in a first working step and fastened to the gearing unit in a further working step. It is advantageously the case that, during the assembly process, the first gearwheel, which is integrally formed on the motor shaft which functions as the first shaft, is inserted through the relatively small cutout of the gearing unit, where it enters into engagement with the third gearwheel.

In accordance with an additional feature of the invention, the second shaft has, for example, a journal onto which the second gearwheel is mounted. The cross section of the journal parallel to the second gearwheel is, for example, triangular, tetragonal or hexagonal. As an alternative to this, the cross section is star-shaped. The second gearwheel expediently includes a central opening which corresponds to the cross section of the journal. In this way, it is made possible for the second gearwheel to be mounted rotationally conjointly or securely on the second shaft. It is, for example, the case that the second shaft itself has a central cutout and receives further constituent parts of the motor vehicle actuator.

In accordance with yet another feature of the invention, it is particularly preferably the case that the gearwheels are parallel to one another and, for example, at least two of the gearwheels lie in a plane. If all of the gearwheels lie substantially in a plane, the structural space of the gearing housing along the axis of rotation is relatively small. The gearwheels are particularly preferably helically toothed. In other words, the profile of the channels, which form the teeth, of each gearwheel has a radial component. Due to this, the surface area that serves for the transmission of force is enlarged, which increases the stability.

Furthermore, friction between the gearwheels in the non-driven state is also increased. For example, the gearing unit is of self-locking configuration and consequently has an efficiency below 50 percent. In this way, in the event of a force acting on the second shaft, the transmission is blocked and a rotational movement of the individual shafts and gearwheels does not occur. Thus, the action of force on the second shaft has substantially no influence. Consequently, an adjustable part which is connected to the second shaft is moved only when the first shaft is driven.

With the objects of the invention in view, there is concomitantly provided an electric parking brake of a motor vehicle, comprising a spindle being displaceable in an axial direction of the spindle, a spindle nut rotatably mounted on the spindle, a support device supporting the spindle nut, the support device having limited resilient flexibility, the support device having at least first and second spring elements being disposed in series with one another in a force transmission chain and being configured to be placed under stress during a transmission of force, and the first spring element having a lower stiffness than the second spring element, the first spring element being configured to be placed under stress under action of a first support force over a first spring travel, a first mechanical engagement device preventing a spring travel beyond the first spring travel and an absorption of force by the first spring element over and above the first support force, the second spring element being formed by a spring module having a second spring, a second mechanical engagement device prestressing the second spring with a second support force for placing the second spring under further stress only when the second support force has been exceeded, a travel sensor indirectly or directly detecting a displacement, and an electric motor driving the spindle nut through the gearing unit according to the invention.

The electric parking brake serves for securing a motor vehicle so as to prevent it from moving. For this purpose, the parking brake includes an actuator for exerting a force on a component, in particular a tensile element, in a first direction, for example for exerting a force on a brake cable pull of the parking brake, which in this context forms the tensile element on which the force is exerted. The electric parking brake includes both a spindle with a spindle nut, which is supported on a support device which exhibits limited resilient flexibility, and at least two spring elements which are disposed in series with one another in the force transmission chain and which can be placed under stress during the transmission of force.

In this case, a first spring element is of lower stiffness than a second spring element, wherein the first spring element can be placed under stress under the action of a first support force over a first spring travel. Furthermore, a spring travel beyond the first spring travel, and an absorption of force by the first spring element over and above the first support force, are prevented by a first mechanical engagement device. Furthermore, the second spring element is formed by a spring module in which a second spring is prestressed with a second support force by a second mechanical engagement device, in such a way that the second spring can be placed under further stress only when the second support force has been exceeded. Furthermore, a travel sensor is provided for indirectly or directly detecting a displacement of the force generating element.

The spindle nut is suitably supported in an axial direction, advantageously by using an axial bearing in the form of a rolling bearing, with respect to the support device, which rolling bearing is, for example, in the form of a needle-roller bearing or in the form of a ball bearing. The spindle nut can suitably be driven in a circumferential direction, whereas the spindle is displaceable in its axial direction by rotation of the spindle nut in order to loosen or tighten a brake cable pull fastened thereto.

The spindle nut is supported in an axial direction on the support device, which partially deflects elastically under the action of the generated force and has two spring elements that can be placed under stress. Each of the spring elements has a spring, in such a way that, altogether, a first spring of the first spring element and a second spring of the second spring element are provided. The first spring, which is for example supported on a housing, is substantially relaxed when no tensile force is applied to the tensile element.

The first spring is the weaker of the two springs and, upon the commencement of the generation of force, is stressed, for example compressed, for example in the force range between 100 N and 150 N by the pressure exerted by the spindle nut, so as to have traveled through a first spring travel. The first spring travel may, for example, amount to 2 mm. According to the invention, after traveling through this travel, the spindle nut or a further element connected thereto abuts against a fixed stop, for example. The first spring is then prestressed and absorbs a part of the axial force, but can be stressed no further, so that forces over and above this are absorbed by the corresponding stop which forms the first mechanical engagement device. A switch on the travel sensor, for example, may be used to detect when the first spring travel, for example 2 mm, has been traveled through. In this context, it is advantageous that, overall, only the fact that the first spring travel has been traveled through needs to be detected and signaled as a fact. In other words, continuous travel measurement during the first spring travel is not necessary.

If the force generated by the spindle nut continues to increase, increased tension is exerted on the tensile element. However, due to the strength of the elements provided in the support device, it is initially the case therein that no component or the like moves, so that the spindle nut itself also remains stationary relative to the support device.

The second spring element has a prestressed second spring which, due to the increased support force of the spindle nut, can initially not be placed under any further stress up until the point at which the support force reaches the level of the second support force, which in turn corresponds to the prestress force of the second spring element, that is to say the force with which the second spring in the second spring element is prestressed. In the event of the force level being exceeded, the second spring can be placed under further stress, in such a way that, in the event of a further increase of the force, for example between 1425 N and 1575 N, a further spring travel is traveled through at the second spring element, that is to say the support device deflects by the further spring travel, and the spindle nut moves further by the corresponding spring travel.

The second travel of the spindle nut can be detected by using the travel sensor. In this case, too, it is necessary merely to detect and signal the fact that the travel has been traveled through, in such a way that the detection may also be effected by using a simple switch. Instead of the switch for the detection of the first and second spring travel, it is also possible to use continuous travel measurement, but the equipping of the travel sensor with two simple switches represents the most economical embodiment. The corresponding signals of the travel sensor may be utilized, for example, for deactivating the drive of the spindle nut when the second support force level is exceeded (since the desired force level of the brake cable pull has been reached), and for enabling the drive of the spindle nut during the release of the brake to be stopped when the tensile force level has fallen to a range around 100 N and the first spring is relaxed. In this way, control of the drive of the spindle nut is particularly simple.

In other words, in the case of a medium level of force being exerted by the spindle nut, there are two prestressed springs in the support device, in each case one of which travels through a limited spring travel, which can be detected by using in each case one proximity switch, when a lower or upper force threshold value is reached.

The switches may, for example, be in the form of Hall sensors which detect the relative movement of a magnet. It is, however, also possible for optical switches, for example in the form of light barriers or light-sensitive semiconductor components, to be provided, which detect moving scale ranges of different brightness or of different transparency.

For example, the first and second spring elements are in the form of compression spring elements. Advantages attained by this reside, in particular, in that only minor settling phenomena can be expected in the mechanical force transmission chain, and in that the spring elements function reliably over a very long time period even under adverse environmental conditions such as temperature and humidity fluctuations.

It is, however, also conceivable for the first and second spring elements to be in the form of tension spring elements. This may be expedient, for example, if the parking brake is actuated by using a thrust element instead of a cable pull. The function of the spring elements is then substantially opposite to that in the variant with compression spring elements.

The first and second springs are advantageously each in the form of helical springs. However, the use of spiral springs or other types of spring elements, for example leaf springs, plate springs or elastomer spring elements in block form, is also conceivable.

An advantageous refinement of the invention provides that the first mechanical engagement device is formed by a stop which is abutted against by an element disposed in the force transmission chain between the force generating element and the first spring element after the first spring travel has been traveled through. This has the result that, in the event of an increase of the force generated by the force generating element, initially the first spring is placed under stress, and that, after the first spring travel has been traveled through, it is not possible for the first spring to be placed under any further stress due to the abutment of the element adjacent the first spring against the fixed stop. Any force over and above this is absorbed not by the first spring but by the stop, in such a way that the first spring and the stop are connected mechanically in parallel with respect to one another.

A further advantageous refinement of the invention provides that the second spring element has a spring, in particular a helical spring, which is prestressed between two end retention elements. In this case, the two end retention elements are displaceable towards one another, counter to the force of the second spring, after the second support force has been exceeded.

The second spring is of significantly stronger and more rigid form than the first spring. In the force transmission chain within the support device, the second spring element acts as a spring module initially as a solid, inflexible block, until the force level of the prestress force—also referred to as a second support force—is reached. When the support force exceeds the level, the second spring is placed under further stress, that is to say is compressed further in the case of a compressible spring or is expanded further in the case of a prestressed tension spring.

If the second spring element is implemented by using a helical spring in the form of a compression spring, the second spring is typically prestressed, on a spring peg or in a spring sleeve, between two end stops. In this case, the end stops are displaceable towards one another in the axial direction of the helical spring when the second support force is exceeded. For example, a stop ring or an end stop plate may be guided in axially movable fashion in a spring sleeve or on a spring peg and restricted in terms of movement at one side by a fixed stop. The spring sleeve or the spring peg of the second spring may be supported by using an end plate within the support device directly on the first spring.

It may particularly advantageously be provided that the support device is disposed on a counterbearing formed, in particular, by a housing which accommodates the support device, on which counterbearing the first spring element, and in the event of the first support force being exceeded, also the second spring element, are supported. A housing of this type may, for example, be in the form of a cast metal housing or of a sheet-metal housing of strong construction: the housing may accommodate not only the spindle nut and the support device but also a drive device for the spindle nut.

The spindle nut is driven by using an electric motor through a gearing unit. For this purpose, the spindle nut is operatively connected to a second shaft which is disposed in stationery fashion in a gearing housing of the gearing unit. For example, the spindle or the spindle nut at least partially forms the second shaft. Attached to the second shaft is a second gearwheel which is in engagement with a third gearwheel. The third gearwheel is driven by using a first gearwheel which is connected to a first shaft, the axis of rotation of which is likewise stationery in the gearing housing. The first shaft is, for example, the rotor shaft of the electric motor.

In order to set the transmission ratio between the first shaft and the second shaft, that is to say the ratio of the rotational speeds of the two shafts during the operation of the electric motor, the gearing housing has a number of spatially offset bearing points for the third gearwheel, in particular two or more bearing points. The bearing point and, in particular, also the radius and the number of teeth of the third gearwheel are selected in accordance with the desired transmission ratio. In this way, it is possible for always the same actuator to be used for a multiplicity of different motor vehicle types. Only the transmission ratio is adjusted, through suitable selection, to the respective motor vehicle type, specifically to the weight thereof. It is expediently also the case that different springs are used, or the spring constants thereof are adapted. By contrast, the same electric motor is used, without the latter being adapted to the motor vehicle type, which leads to reduced stockkeeping.

A further advantageous refinement of the invention provides that the travel sensor has at least one sensor element and at least one encoder element which are movable relative to one another and of which one is indirectly or directly connected to the force generating element, whereas the respective other is connected to the counterbearing. It is thus possible by using the travel sensor to detect the relative movement between the spindle nut and the counterbearing, which is a measure of the stress of the support device and of the first and second spring elements, and thus of the generated force.

By using the basic concept of the invention, it is possible in conjunction with a travel sensor of this type to detect the passing of a travel mark only in a defined range corresponding to a low generated force and/or in a second force range which corresponds to a relatively high force—specifically advantageously the maximum force level to be generated by the spindle nut. It is particularly advantageously the case that either two encoder elements or one sensor element or two sensor elements and one encoder element are provided, in such a way that both the attainment of the low force level (first support force) and the attainment of the second force level (second support force) can each be separately detected.

In this respect, it is advantageously provided that the travel sensor is provided for outputting a first signal when the force generating element has traveled through the first spring travel and for outputting a second signal when the force generating element has traveled through a further travel after the second support force has been reached.

In the range between exceeding the level of the first support force and attaining the second support force, further movements of the support device are practically negligible. Accordingly, in this force range, despite the increase in generated force, the spindle nut moves to a negligibly small extent.

By virtue of the fact that it is not necessary for data regarding the movement of the spindle nut to be detected and evaluated continuously, for example on the basis of different measured magnetic field strengths, in the travel sensor, but in the minimal case only a first signal is output when the first support force level is reached and a second signal is output when the second support force level is reached, the processing of the travel signals and thus of the information regarding the generated force is simplified in such a way that it does not need to be performed at the travel sensor by using a separate microcontroller or microprocessor. Rather, the small amount of data that arises can be jointly taken on by a local unit, which is separate from the spindle which serves for force generation and the spindle nut, and which has a dedicated processor or microcontroller. The data can be transported between the device for force generation and the data processing device through electrical or optical data lines.

Other features which are considered as characteristic for the invention are set forth in the appended claims.

Although the invention is illustrated and described herein as embodied in a gearing unit and an electric parking brake having a gearing unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
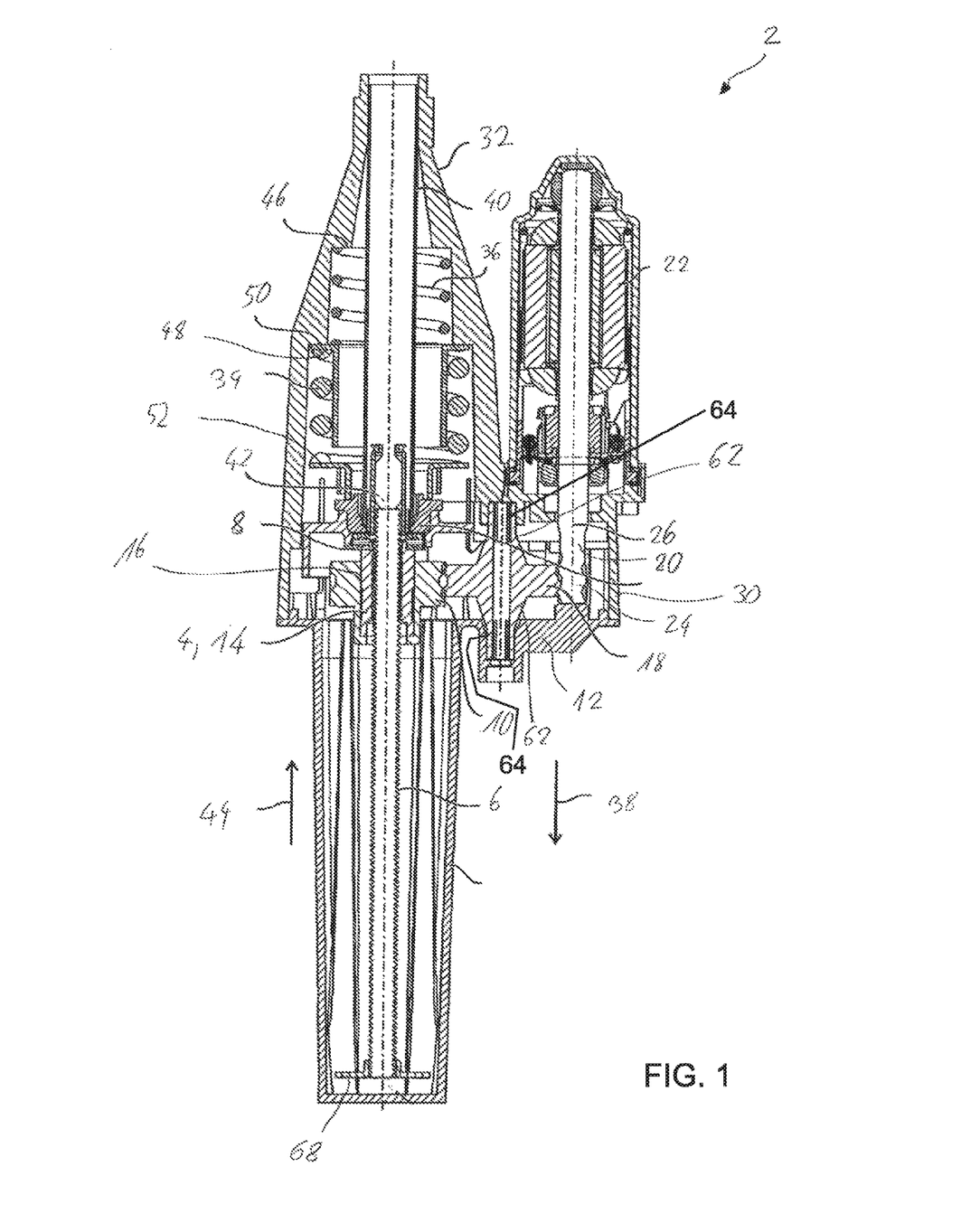
FIG. 1 is a diagrammatic, longitudinal-sectional view of an electric parking brake.

Referring now in detail to the figures of the drawings, in which parts corresponding to one another are denoted by the same reference signs, and first, particularly, to FIG. 1 thereof, there is seen a sectional side view of an electric parking brake 2 of a motor vehicle, having a spindle nut 4 which, as a force generating element, interacts with a spindle 6. The spindle nut 4 is mounted so as to be rotatable and is supported on an axial bearing 8. The spindle nut 4 carries, on its outer side, a helically toothed second gearwheel 10 of a gearing unit 12. In other words, the spindle nut 4 forms a second shaft 14 to which the second gearwheel 10 is attached. The second gearwheel 10 has, in the center, an opening 16 which corresponds to the cross section of the spindle nut 4, within which opening the spindle nut 4 in the form of a journal is disposed in a form-locking and rotationally secure manner.

The spindle nut 4 can be driven, through a third gearwheel 18, by a first shaft 20, which is the rotor shaft of an electric motor 22. In this case, the free end of the rotor shaft 20 is provided with cut-out grooves 28 running in spiral fashion along an axis of rotation 26 to form a first gearwheel 24. In other words, the first gearwheel 24 is integral with the first shaft 20, and the outer diameter of the first gearwheel 24 is equal to the diameter of the first shaft 20.

The electric motor 22 is fastened at the end thereof to a gearing housing 30, within which the gearwheels 10, 18, 24 are situated and which projects into a spindle housing 32 in which the spindle nut 4, the spindle 6 and the axial bearing 8 are disposed. The axial bearing 8 is typically in the form of a rolling bearing and is supported on a second spring element 34, which in turn, in the illustrated state, is supported on a first spring element 36 in an axial direction 38. The first spring element 36 is in the form of a helical spring which coaxially surrounds the spindle 6 or its displacement travel during rotation of the spindle nut 4.

Reference sign 40 denotes a sleeve which surrounds and protects the spindle 6 in the region of the spring elements. A Bowden cable receptacle 42 is attached to that end of the spindle 6 which faces toward the sleeve 40. A non-illustrated Bowden cable engages into the Bowden cable receptacle 42 for the actuation of brake pads which act on a brake disk and through the use of which a movement of the motor vehicle is prevented.

If the spindle 6 moves in the direction of the arrow 38, the Bowden cable is pulled, or the tensile force is increased. In this case, a force acts on the spindle 6 and the spindle nut 4 in the direction of an arrow 44. In the event of a movement of the spindle 6 in the direction of the arrow 44, the pulling action is eliminated, and the tensile force is reduced.

During the course of the force generation, the spindle nut 4 is supported on the first spring element 36 and on the second spring element 34. The first spring element 36 is in the form of a spring which is softer, with a lower spring constant, than the spring of the second spring element 34, so that the first spring 36 is compressed first, and to a greater extent than the spring of the second spring element 34. The first spring 36 is supported on a first stop 46 which is formed by using a step of the spindle housing 32.

In the case of a low tensile force being generated, and a corresponding support force being applied by the first spring 36, the latter is compressed to an extent by virtue of the second spring element 34 being moved, undeformed, toward the first spring 36. When the first spring travel has been traveled through, a first end retention element 48 of the second spring element 34 abuts against a stationary second stop 50. At this point in time, a second end retention element 52 of the second spring element 34 also moves in the direction of the arrow 44, without the second spring element 34 being compressed or expanded in the axial direction of the spring.

Correspondingly, the axial bearing 8 moves to an extent, typically in the region of 2 mm, in the direction of the arrow 44, in such a way that the spindle nut 4 also performs this movement. The toothing of the second and third gearwheels 10, 18 permits such a relative movement of the two gearwheels with respect to one another in the axial direction 44.

If, by further rotation of the spindle nut 4, the tensile force is increased, the first spring 36 is not compressed any further because the first end retention element 48, which together with the second mechanical stop 50 forms a first mechanical engagement device, abuts against a fixed stop. The first spring 36 does not absorb any further forces beyond the corresponding partial compression.

With a further increase in the tensile force or the support force, a further movement in the axial direction takes place only when the second spring element 34 is compressed in the axial direction 44 when the level of the second support force is reached.

Figure 2:
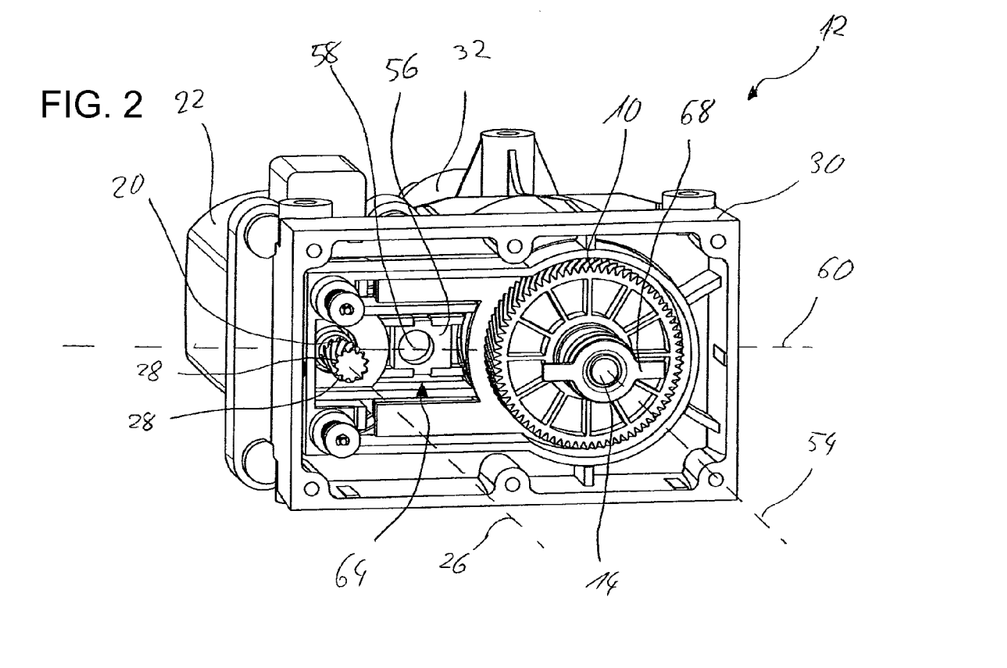
FIG. 2 is a perspective view of a gearing unit with a third gearwheel removed.

FIG. 2 shows the gearing unit 12 in a perspective view, wherein the third gearwheel 18 and a cover of the gearing housing 30 have been removed. Both the axis of rotation 26 of the first shaft 20 and an axis of rotation 54 of the second shaft 14 run in parallel through the box-shaped main body of the gearing housing 30, and are both perpendicular to the base thereof and also stationary. A movable slide 56 which is also introduced into the base has an opening 58. The plane of extent of the preferably circular opening 58 in this case is substantially parallel to the plane of extent of the second gearwheel 10 and perpendicular to the axes of rotation 26, 54. The slide 56 is displaceable along a straight adjustment line 60 between the first shaft 20 and the second shaft 14, wherein the central point of the circular opening 58 lies on the straight adjustment line 60. The straight adjustment line 60 is furthermore perpendicular to the axes of rotation 26, 54 and intersects them.

Figure 3:
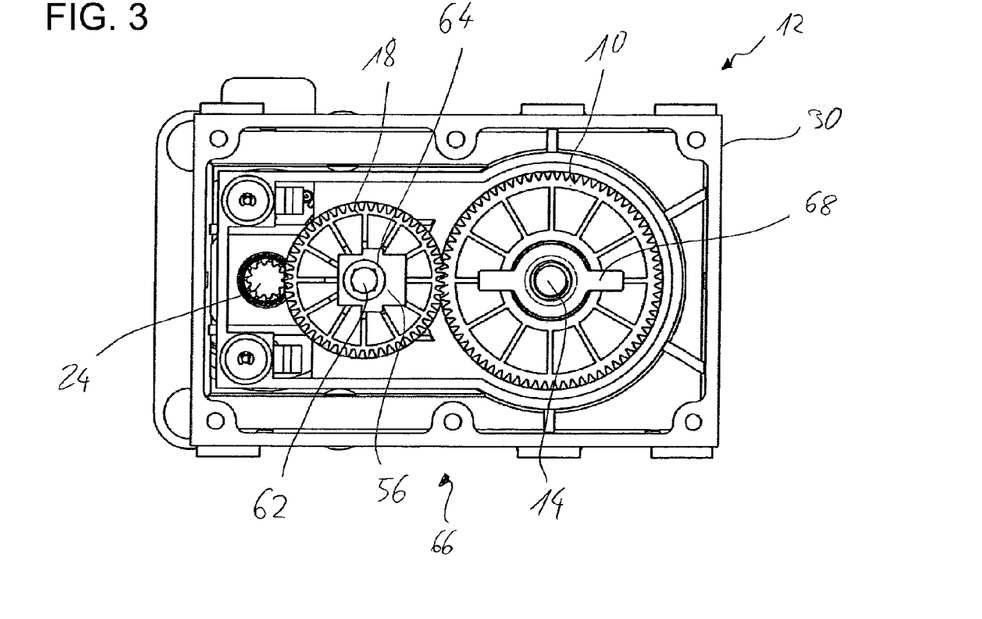
FIG. 3 is a plan view of the gearing unit.

The non-illustrated cover of the gearing housing 30 likewise has such a slide 56, as illustrated in FIG. 3. In this case, the gearing unit 12 is shown in a front view with the third gearwheel 18 installed. The third gearwheel is parallel to the second gearwheel 10. Only the slide 56 of the cover of the gearing housing 30 is shown. The third gearwheel 18 has two axially running axle journals 62 (see FIG. 1), each of which is inserted through the opening 58 of the respective slide 56. Consequently, the third gearwheel 18 is disposed between the two slides 56, which are substantially parallel to the third gearwheel 18. The two slides 56 and the opening 58 thereof, which has a cross section corresponding to that of the respective axle journal 62, thus form a bearing point 64 for the third gearwheel 18. Due to the mobility of the slides 56 along the respective straight adjustment line 60, it is made possible for the bearing point 64 to be moved between the two axes of rotation 26, 54.

Figure 4:
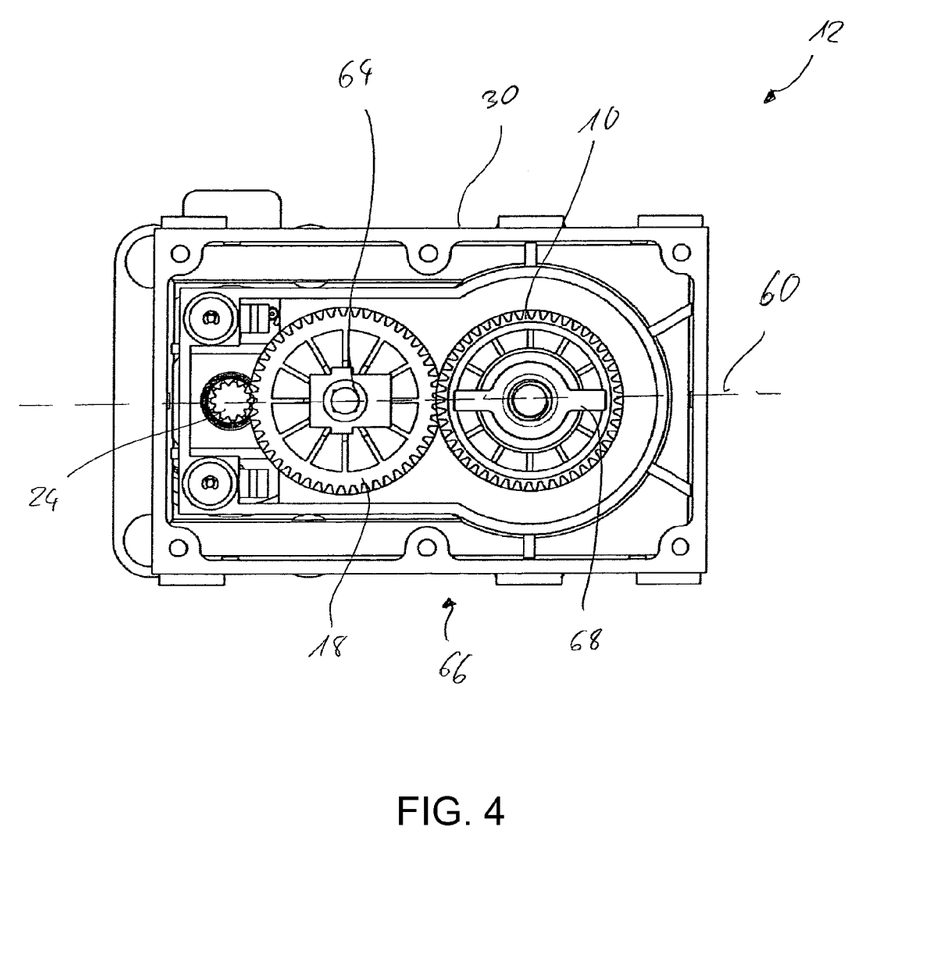
FIG. 4 is a plan view of the gearing unit according to FIG. 3 with a changed transmission ratio.

In this case, the position of the bearing point 64 and the radius of the gearwheels 10, 24 determine a transmission ratio 66 between the first shaft 20 and the second shaft 14. FIG. 3 shows a first transmission ratio 66 and FIG. 4 shows a further transmission ratio 66. In order to vary the transmission ratio 66, in a first step, the cover of the gearing unit 12 is removed and the third gearwheel 18 is removed. In a further working step, a winged nut 68 fastened to the free end of the spindle 6 is removed. The winged nut 68 prevents the spindle nut 4 from being unscrewed from the spindle 6 during normal operation, as is seen in FIG. 1. In a further working step, the second gearwheel 10 is removed from the gearing unit 12 and is replaced with a new second gearwheel 10. For adjustment purposes, the bearing point 64 is displaced in such a way that the axis of rotation of the third gearwheel 18 is situated centrally between the first gearwheel 24 and the now new second gearwheel 10. This is realized by positioning the two slides 56. In a further step, a new third gearwheel 18 is inserted, and the gearing housing 30 is closed.

The transmission ratio 66 shown in FIG. 3 is such that a rotational movement of the first shaft 24 leads to a relatively slow rotational movement of the second shaft 14. By contrast, in the case of the transmission ratio 66 illustrated in FIG. 4, an identical rotational movement of the first shaft 24 causes an increased rotational speed of the second shaft 14. This is achieved due to the reduced radius of the second gearwheel 10 and the increased radius of the third gearwheel 18. This has the effect that, in the case of the gearing unit 12 shown in FIG. 4, the bearing point 64 has been shifted in the direction of the second shaft 14.

Rather than the transmission ratio 66 being varied after assembly has already taken place this is, for example, already taken into consideration at the initial assembly stage, and a suitable second and third gearwheel 10, 18 are selected. Due to the different transmission ratio 66, the gearing unit 12 shown in FIG. 3 transmits a relatively high force, so that even a vehicle of relatively high weight can be secured by using the electric parking brake 2. In a motor vehicle with a relatively low weight, a gearing unit 12 shown in FIG. 4 is adequate. If use is made of the same electric motor 22 with the same actuation device, the exertion of force by the gearing unit on the Bowden cable is faster, so that the motor vehicle is already secured by using the parking brake 2 at an early point in time.

The invention is not restricted to the exemplary embodiments described above. Rather, a person skilled in the art may also derive other variants of the invention therefrom without departing from the subject matter of the invention. In particular, it is also the case that all individual features described in conjunction with the exemplary embodiments may also be combined with one another in a different way without departing from the subject matter of the invention.

The invention claimed is:

1. An electric parking brake of a motor vehicle, the electric parking brake comprising:
   a spindle being displaceable in an axial direction of said spindle;
   a spindle nut rotatably mounted on said spindle;
   a support device supporting said spindle nut, said support device having limited resilient flexibility, said support device having at least first and second spring elements being disposed in series with one another in a force transmission chain and being configured to be placed under stress during a transmission of force, and said first spring element having a lower stiffness than said second spring element;
   said first spring element being configured to be placed under stress under action of a first support force over a first spring travel;
   a first mechanical engagement device preventing a spring travel beyond said first spring travel and an absorption of force by said first spring element over and above said first support force;
   said second spring element being formed by a spring module having a second spring;

a second mechanical engagement device prestressing said second spring with a second support force for placing said second spring under further stress only when said second support force has been exceeded;

a travel sensor indirectly or directly detecting a displacement;

a gearing unit including a gearing housing, a driven first shaft and a driving second shaft disposed in said gearing housing, said shafts each having a stationary axis of rotation, a first gearwheel attached to said first shaft and a second gearwheel attached to said second shaft, a third gearwheel through which said first gearwheel and said second gearwheel engage one another, said gearing housing having a displaceable bearing point or at least two spatially offset bearing points, between said first shaft and said second shaft, for said third gearwheel; and an electric motor driving said spindle nut through said gearing unit.

2. The electric parking brake according to claim 1, wherein said bearing points are disposed along a straight adjustment line.

3. The electric parking brake according to claim 2, wherein said axes of rotation lie on said straight adjustment line.

4. The electric parking brake according to claim 2, wherein said third gearwheel has an axle journal, and said bearing point includes a movable slide with an opening into which said axle journal can be inserted.

5. The electric parking brake according to claim 1, wherein said first gearwheel is integrally formed on said first shaft.

6. The electric parking brake according to claim 1, wherein said second shaft has a journal for holding said second gearwheel.

7. The electric parking brake according to claim 1, wherein said gearwheels have at least one of mutually parallel toothings or helical toothings.

* * * * *